United States Patent [19]
DeChristopher

[11] Patent Number: 4,936,686
[45] Date of Patent: Jun. 26, 1990

[54] SPHERICAL ROLLER FOR KNEADING A DOUGH BALL

[76] Inventor: Eugene L. DeChristopher, 20 Ahlstrom La., Cotati, Calif. 94928

[21] Appl. No.: 430,430

[22] Filed: Nov. 2, 1989

[51] Int. Cl.⁵ .............................................. B29B 1/06
[52] U.S. Cl. ................................ 366/69; 99/450.1; 99/516; 401/28; 29/110.5; 29/121.1
[58] Field of Search ................. 99/450.1, 348; 366/69, 366/71–73, 348, 349, 342, 343; 426/443; 29/110.5, 121.1, 121.5–121.8, 125; 222/224, 414; 401/28; 7/111

[56] References Cited
U.S. PATENT DOCUMENTS

| | | | |
|---|---|---|---|
| 745,923 | 12/1903 | Stanley | 29/110.5 |
| 819,772 | 5/1906 | Latham | 29/110.5 |
| 1,177,197 | 3/1916 | McNeil | 29/110.5 |
| 4,426,200 | 1/1984 | Muller | 7/111 |
| 4,492,223 | 1/1985 | Burke | 401/28 |
| 4,571,769 | 2/1986 | Ford | 15/230.11 |
| 4,718,769 | 1/1988 | Conkey | 366/69 |
| 4,811,726 | 3/1989 | Goncalves et al. | 401/28 |
| 4,815,859 | 3/1989 | Weinkle | 366/69 |

Primary Examiner—Timothy F. Simone
Attorney, Agent, or Firm—Melvin R. Stidham

[57] ABSTRACT

There is shown a roller for pressing and working a dough ball into a pizza shell. In its preferred form, the roller is in the form of a spherical cluster of balls, which are molded or otherwise formed on a polygonal core. The spherical cluster is rotatably contained within a complementary spherical shell carried on the lower end of a fluid duct. Olive oil or other material flowing through the duct will flow ports in the shell to be carried by the cluster of balls and distributed over the dough ball. Ports in the side of the duct allow the oil to flow around the shell to drip directly onto the dough ball near the outer edges thereof. A conical hood around the cluster of balls and the carrier block and retain any olive oil vapors that otherwise may be inhaled by bakery workers.

5 Claims, 3 Drawing Sheets

SPHERICAL ROLLER FOR KNEADING A DOUGH BALL

BACKGROUND OF THE INVENTION

Traditionally, pizza shells have been formed by kneading and pressing a ball of proofed dough by hand into a relatively thin shell. Efforts to so prepare pizza shells entirely by machinery have not been successfull in that rollers, pressers and the like do not simulate the manipulations of the human fingers and, instead, squeeze and flatten the dough to an uninteresting thin but solid sheet without gas pockets, which might otherwise expand and rise in the oven to a light, relatively fluffy consistency. A hand operated roller designed to simulate hand kneading of a pizza shell has been disclosed in Weinkle U.S. Pat. No. 4,815,859 for "Roller for Making Pizza Shell", but that roller disclosed is hand operated and has to be rolled back and forth a number of times in order to work the dough completely.

In my previous U.S. Pat. No. 4,696,823, dated Sept. 29, 1987, I described a machine with clusters of balls to be rolled over pizza dough balls. However, the rollers there described are limited as to the size of dough ball it can handle; they are difficult to manufacture; and the system there described for applying olive oil or the like to the dough has not tested satisfactorily.

OBJECTS OF THE INVENTION

It is an object of this invention to provide apparatus for high production kneading of proofed dough balls.

It is a further object of this invention to provide means for producing pizza shells on a production basis while leaving the dough relatively fluffy and dimpled.

It is a further object of this invention to provide apparatus for kneading dough balls while applying olive oil or the like to the surface thereof.

Other objects and advantages of this invention will become apparent from the description to follow, particularly when read in conjunction with the accompanying drawings.

SUMMARY OF THE INVENTION

In carrying out this invention, a generally spherical roller is molded or otherwise formed with a generally polygonal core, preferably having fourteen sides or more. From each of the fourteen sides, there protrudes the major portion of a ball so that the resulting roller is a cluster of balls, which when rolled over the dough, forms a plurality of round depressions or dimples to simulate the manipulations of the human hand. The spherical roller is encased in an inverted, somewhat larger than hemispherical, shell. Oil is introduced through the top of the shell to be distributed over the dough ball by the spherical cluster of balls as they knead and, also, around the shell to be applied directly to the dough.

DESCRIPTION OF A PREFERRED EMBODIMENT

Figure 1:
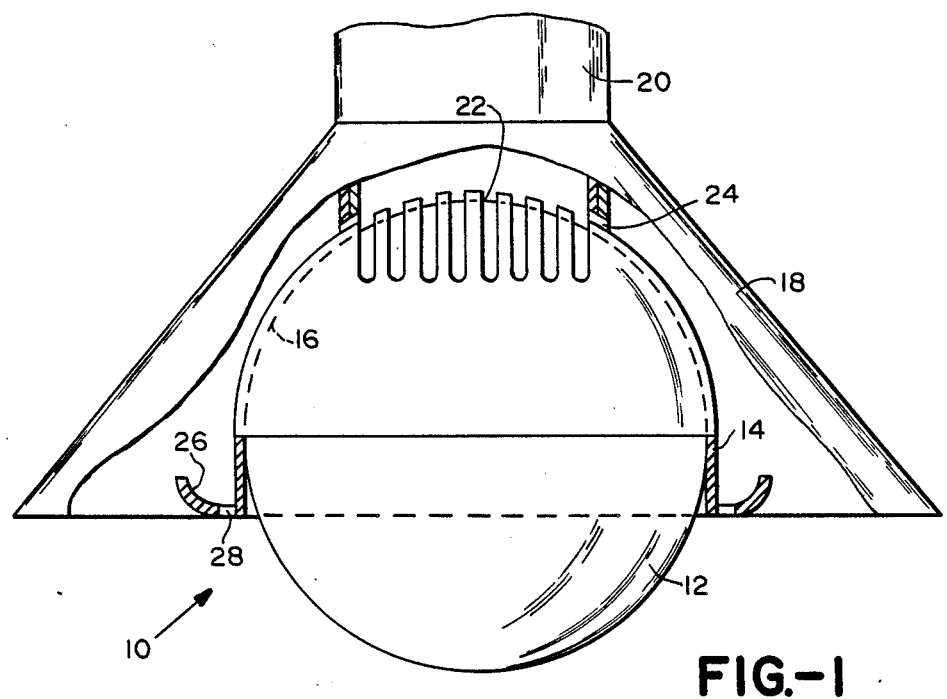
FIG. 1 is a side elevation partially broken away of a smooth spherical ball for initial kneading.

The Embodiment of FIG. 1

In this embodiment, the dough rolling assembly 10 includes a relatively smooth sphere 12, which is snugly but rotatably encased in a complementary shell 14 with a spherical inner surface 16 to accommodate the ball 12. Suitable means, such as a split ring (not shown) are provided to retain the sphere 12 in the shell 14. The shell 14 is surrounded by a conical hood 18 depending from a generally vertical duct 20 through which a fluid, such as olive oil, or a particulate food material, such as grated cheese, bread crumbs, poppy seeds, sesame seed and the like may be delivered. The hood 18 may be welded or otherwise secured to the duct 20 to be supported therefrom.

Through the top of the spherical roller carrier shell 14 is a series of direct ports, such as slots 22 through which the olive oil or other material may be applied directly to the sphere 22 to be distributed by the sphere over the surface of a dough ball (not shown) being rolled or kneaded. In addition, a series of lateral ports 24 are formed around the duct 20 at the lower end thereof so that olive oil or other fluids will flow down the sides of the shell 14 and into a trough 26. The olive oil or other fluid will then drip directly onto the dough ball through a series of ports 28 formed around the bottom of the trough. The conical hood 18 catches any olive oil mist that may rise from below to prevent one breathing the vapors.

The smooth ball embodiment of FIG. 1 may be employed for initial rolling of the dough ball prior to subsequent formation into a pizza shell.

Figure 2:
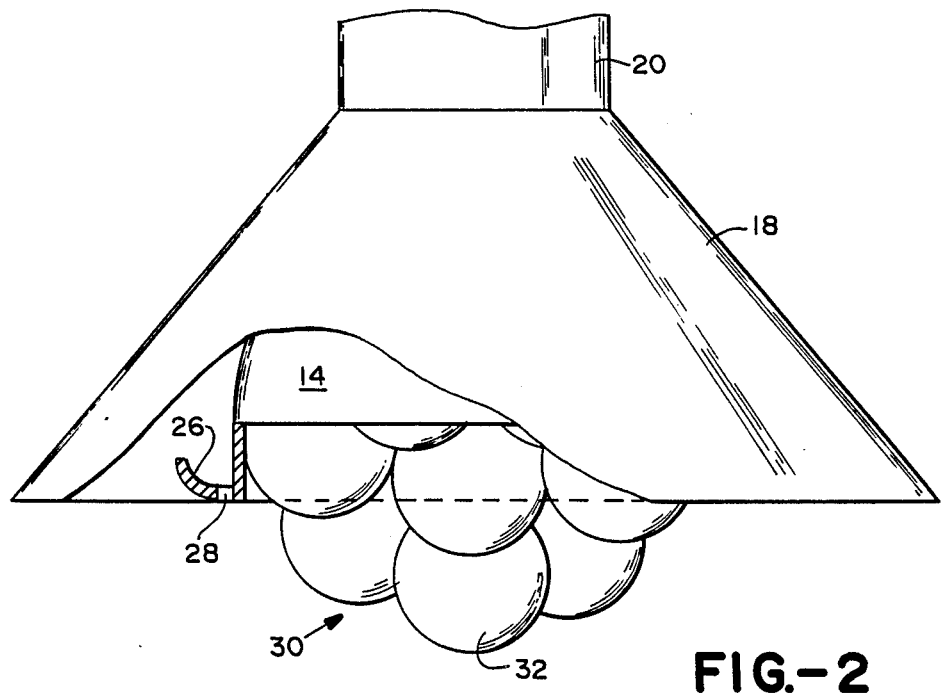
FIG. 2 is an elevation view partially broken away for a spherical cluster of balls.
Figure 3:
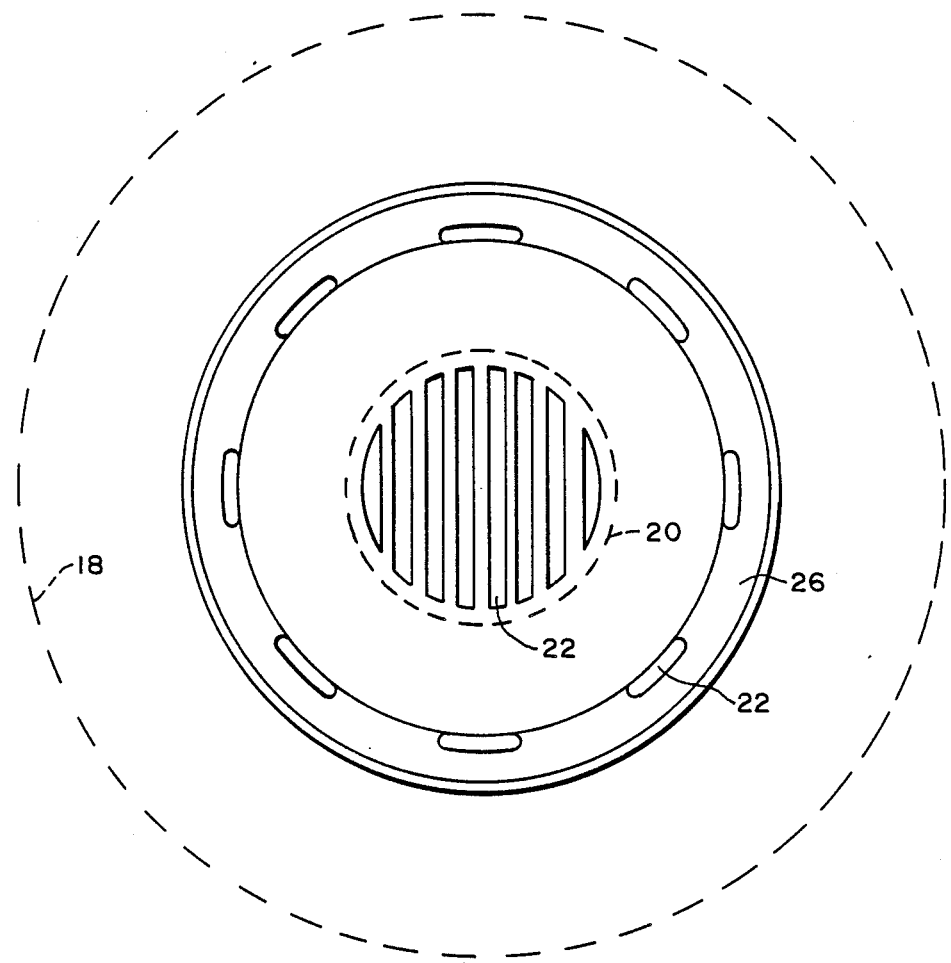
FIG. 3 is bottom view of the hood for the spherical cluster.

The Embodiment of FIG. 2

In this embodiment, the spherical roller 30 is in the form of a spherical cluster of balls 32, which as in the embodiment of FIG. 1, is closely but rotatably accommodated in a complementary spherical shell 14. Again, suitable means (not shown) are provided to prevent the spherical roller 30 from falling out while allowing it to rotate freely. The cluster of balls 32 impress the dough ball with a plurality of closely spaced "dimples" and can form the dough into a relatively thin shell while leaving the pockets of gas between the dimples, which can subsequently expand in the oven to form a relatively light, fluffy pizza shell. The dimples formed in the dough ball simulate the impressions formed when a dough ball is manipulated by human fingers.

Figure 4:
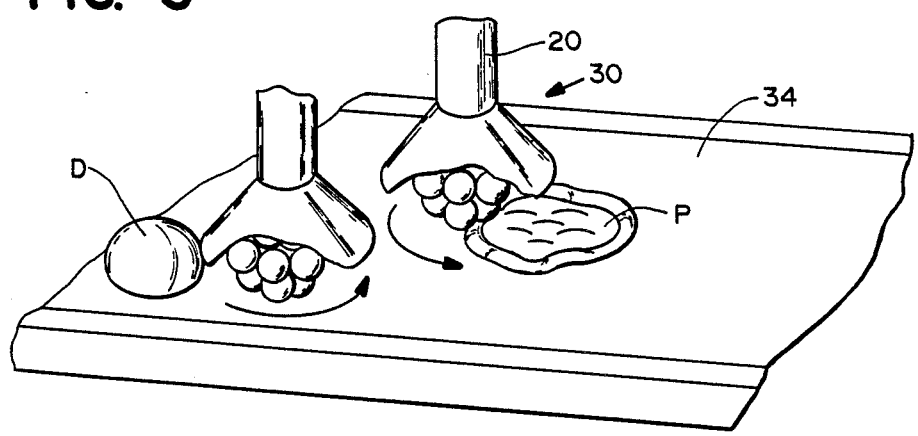
FIG. 4 is a view in perspective of the spherical rollers as mounted in a production line.

Referring now to FIG. 4, a plurality of spherical roller assemblies 10 and/or 30 may be mounted above a conveyor belt 34 to move a plurality of dough balls D as they are being formed by the rotating assemblies 30 into pizza shells P. From the kneading and rolling assemblies 30 the formed pizza shells P are delivered to an oven (not shown).

Figure 5:
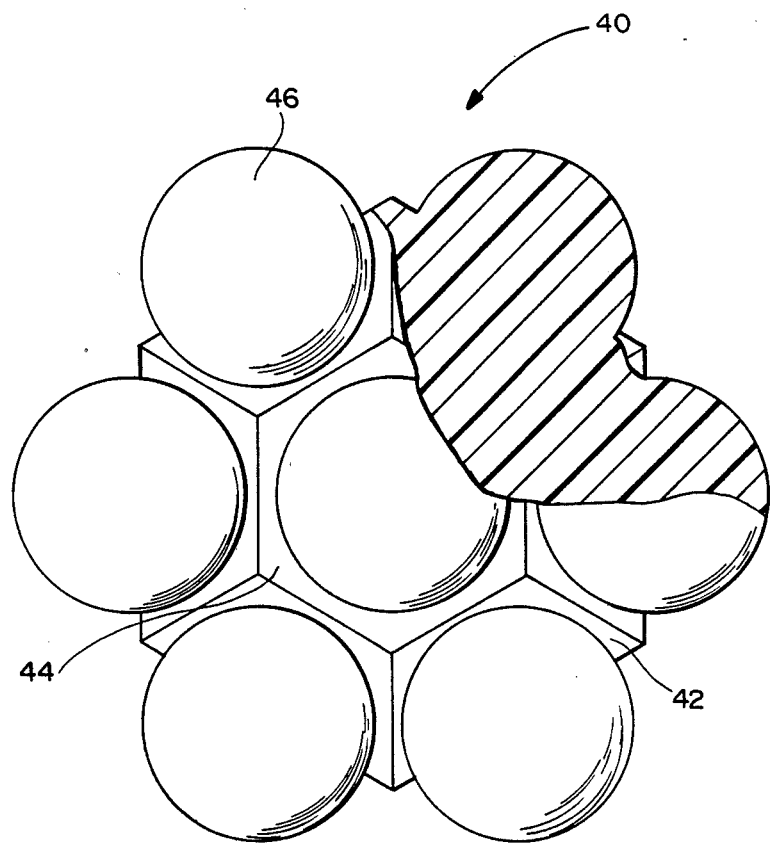
FIG. 5 is an enlarged view of a spherical cluster formed aroung a polygonal core.

The Embodiment of FIG. 5

Referring now to FIG. 5, the generally spherical roller 40 may be molded of plastic or the like into a cluster of balls 46 with a central core of polyhedron configuration, which may have, as shown, twelve trapezoidal sides 42 (six on each side) and two hexagonal sides 44. Protruding from each side 42 and 44 is the major portion of a ball 46 (say ¾ of a ball). In this manner, each ball 46 may be contained within a side 42 or 44 and, with the sides disposed at an angle to each other, the balls may be closely nested or clustered at their equators. In this way, as the roller 40 rolls over a dough ball it will impress a series of closely spaced spherically concave dimples to simulate the impressions made by working with human fingers.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. A roller for kneading and shaping a dough ball into a pizza shell comprising:
    an applicator having an outer surface to engage and press against said dough ball;
    points on said outer surface of said applicator defining a sphere of a predetermined diameter;
    a generally conical hood having a small diameter upper portion and a large diameter lower portion supporting and covering said applicator;
    a fluid conduit extending down through said upper portion of said hood; an inverted applicator carrier shell having a concave inner surface secured under said hood to said conduit;
    direct flow ports through the top of said shell within said conduit;
    lateral flow ports through said conduit above said shell;
    the inner surface of the shell being spherical to conform closely to said sphere defining points on the outer surface of said applicator,
    said applicator being rotatably carried in said shell;
    a trough around the lower portion of said shell; and
    drip ports spaced around said trough.

2. The roller defined by claim 1 wherein said applicator comprises:
    a sphere closely but rotatably received in said shell.

3. The roller defined by claim 1 wherein said applicator comprises:
    a tight cluster of balls secured to a central core to define a sphere.

4. The roller defined by claim 3 wherein said central core comprises:
    a polyhedron having at least fourteen faces;
    a ball secured to each of said faces.

5. The roller defined by claim 4 wherein;
    the protruding portion of each ball is the major portion of a sphere.

* * * * *